(12) United States Patent
Denoue et al.

(10) Patent No.: US 10,528,227 B2
(45) Date of Patent: Jan. 7, 2020

(54) SYSTEMS AND METHODS FOR LINKING ATTACHMENTS TO CHAT MESSAGES

(71) Applicant: FUJI XEROX CO., LTD., Tokyo (JP)

(72) Inventors: Laurent Denoue, Verona (IT); Scott Carter, Menlo Park, CA (US); Jennifer Marlow, Palo Alto, CA (US); Matthew L. Cooper, San Francisco, CA (US)

(73) Assignee: FUJI XEROX CO., LTD., Tokyo (JP)

( * ) Notice: Subject to any disclaimer, the term of this patent is extended or adjusted under 35 U.S.C. 154(b) by 77 days.

(21) Appl. No.: 15/490,784

(22) Filed: Apr. 18, 2017

(65) Prior Publication Data

US 2018/0300309 A1    Oct. 18, 2018

(51) Int. Cl.
*G06F 3/048* (2013.01)
*G06F 3/0482* (2013.01)
*G06F 17/22* (2006.01)

(52) U.S. Cl.
CPC ........ *G06F 3/0482* (2013.01); *G06F 17/2229* (2013.01)

(58) Field of Classification Search
CPC .......... G06F 17/30867; G06F 17/2235; H04L 51/04; H04L 51/32; H04L 51/046; H04L 65/403; H04L 51/08; H04L 51/10
See application file for complete search history.

(56) References Cited

U.S. PATENT DOCUMENTS

| | | | | |
|---|---|---|---|---|
| 7,941,486 B2 * | 5/2011 | Bellotti | ................ | G06Q 10/107 705/301 |
| 9,021,041 B2 * | 4/2015 | Knighton | ............. | G06Q 10/107 709/203 |
| 9,319,357 B2 * | 4/2016 | Moyers | ................... | H04L 51/04 |
| 2006/0294189 A1 * | 12/2006 | Natarajan | ............... | H04L 51/04 709/206 |
| 2007/0016613 A1 * | 1/2007 | Foresti | ................. | G06Q 10/107 |
| 2008/0005240 A1 * | 1/2008 | Knighton | ............. | G06Q 10/107 709/204 |
| 2009/0248818 A1 * | 10/2009 | Hara | .................... | G06Q 10/107 709/206 |
| 2010/0228989 A1 * | 9/2010 | Neystadt | ................. | G06F 21/10 713/185 |
| 2012/0019365 A1 * | 1/2012 | Tuikka | ................... | G06Q 30/02 340/10.1 |

(Continued)

OTHER PUBLICATIONS

Billsus, Daniel, Hilbert, David M., and Maynes-Aminzade, Dan, "Improving Proactive Information Systems". 2005, In Proceedings of the 10th International Conference on Intelligent User Interfaces (IUI '05). ACM, New York, NY, USA, 159-166.

(Continued)

*Primary Examiner* — Linh K Pham
(74) *Attorney, Agent, or Firm* — Procopio, Cory, Hargreaves & Savitch LLP (57) ABSTRACT

Example implementations described herein are directed to a system for inserting document links or document fragments in messaging applications. For input provided to a messaging application, example implementations can parse the input to determine document parameters, determine previously linked documents in messages of the messaging application corresponding to the document parameters; and embed at least one of a selected document fragment or document link from the determined previously linked documents.

18 Claims, 10 Drawing Sheets

(56) References Cited

U.S. PATENT DOCUMENTS

| | | | | |
|---|---|---|---|---|
| 2013/0036344 | A1* | 2/2013 | Ahmed | G06F 16/9535 715/205 |
| 2015/0302096 | A1* | 10/2015 | Iwasaki | G06F 16/90332 707/722 |
| 2016/0197872 | A1* | 7/2016 | Khattar | G06F 16/9535 709/206 |
| 2016/0294958 | A1* | 10/2016 | Zhang | G01C 21/005 |
| 2016/0295384 | A1* | 10/2016 | Shan | H04W 4/21 |
| 2016/0301639 | A1* | 10/2016 | Liu | G06Q 50/01 |
| 2017/0269800 | A1* | 9/2017 | Park | G06F 3/0486 |
| 2017/0353414 | A1* | 12/2017 | Ertmann | H04L 51/32 |
| 2018/0121394 | A1 | 5/2018 | Denoue et al. | |

OTHER PUBLICATIONS

Bloechle, Jean-Luc, Pugin, Catherine, and Ingold, Rolf. "Dolores: An Interactive and Class-Free Approach for Document Logical Restructuring". Document Analysis Systems. 2008.

Carter, S. and Denoue, L. "SeeReader: An (Almost) Eyes-Free Mobile Rich Document Viewer". International Journal of Computer Science Issues (IJCSI). vol. 1. 2009.

Zha, Zheng-Jun, Yang, Linjun, Mei, Tao, Wang, Meng and Wang, Zengfu. 2009. "Visual Query Suggestion". In Proceedings of the 17th ACM international conference on Multimedia (MM '09). ACM, New York, NY, USA, 15-24. DOI: http://dx.doi.org/10.1145/1631272.1631278.

Denoue, L., Hilbert, D., Adcock, J., Billsus, D., & Cooper, M. "ProjectorBox: Seamless Presentation Capture for Classrooms". Proceedings of World Conference on E-Learning in Corporate, Government, Healthcare, and Higher Education 2005.

Goecke, Daniela, Witt, Andreas. "Exploiting Logical Document Structure for Anaphora Resolution". LREC 2006, Genoa, Italy.

Novet, Jordan, "Google acquires team behind website sharing app Kifi, shutting it down soon" Downloaded Apr. 18, 2017 from http://venturebeat.com/2016/07/12/google-acquires-team-behind-website-sharing-app-kifi-shutting-it-down-soon/, Jul. 12, 2016, 3 pages.

Jiang, Yu, Liu, Jing, Li, Zechao, Xu, Changsheng, and Lu, Hanqing. 2012. "Chat with Illustration: A Chat System with Visual Aids". In Proceedings of the 4th International Conference on Internet Multimedia Computing and Service (ICIMCS '12). ACM, New York, NY, USA, 96-99. DOI=http://dx.doi.org/10.1145/2382336.2382364.

Kim, Joon-Gyum, Wu, Chia-Wei, Chiang, Alvin, Ko, Jeonggil, and Lee, Sung-Ju. 2016. "A Picture is Worth a Thousand Words: Improving Mobile Messaging with Real-time Autonomous Image Suggestion". In Proceedings of the 17th International Workshop on Mobile Computing Systems and Applications (HotMobile '16). ACM, New York, NY, USA, 51-56.

Loh, Stanley, Lichtnow, Daniel, Kampff, Adriana Justin Cerveira, Moreira de Oliveira, Jose Palazzo. "Recommendation of Complementary Material during Chat Discussions". Knowledge Management & E-Learning: An International Journal (KM&EL), vol. 2, No. 4 (2010).

Sinisalo, Lari. "Logical Segmentation and Labeling of PDF Documents". Master Thesis Aalto University, 2014.

Shafait, Faisal and Smith, Ray. 2010. "Table Detection in Heterogeneous Documents". In Proceedings of the 9th IAPR International Workshop on Document Analysis Systems (DAS '10). ACM, New York, NY, USA, 65-72.

* cited by examiner

| SLIDE | FIGURE | FORMULA | PARAGRAPH | PAGE | INTRODUCTION |
|---|---|---|---|---|---|
| REFERENCES | ABSTRACT | TABLE | CHART | GRAPH | BULLET |
| PICTURE | INDENTATION | ICON | FAQ | SCREENSHOT | IMAGE |
| BARCHART | FOLDER | REVIEW | SPREADSHEET | DOC | PPT |
| PDF | EXCEL | TXT | FIRST (1) | SECOND (2) | WORD |
| EMAIL | DROPBOX | PAPER | QUOTE | PPTX | BOX |
| WHITEBOARD | OWNCLOUD | 365 | SHAREDOCS | ONEDRIVE | SKETCHES |
| POSTER | ROSTER | LINK | GDOC(S) | SYLLABUS | HOMEPAGE |
| VISUAL DESIGN | PNG | JPG | RUBRIC | FORM | DRAFT |
| WRITEUP | LIST | SECTION | TRANSCRIPT | SEGMENT | SHEET |
| COLUMN | ROW | HISTOGRAM | | | |

FIG. 2

| REVIEW(ED) | COMMENT(ED) | UPLOADED | DELETED | EDITED | ERASED |
|---|---|---|---|---|---|
| COPIED | SELECTED | WENT OVER | HIGHLIGHTED | LOOKS GOOD | LOOKING AT |
| LINKED | SHARED | VERSIONS | FILE | FORMAT(TED, TING) | SUMMARY |
| SCANNED | ANNOTATED | <NUMBER>MB/KB | COPY EDITING | EDITS | VERSION |
| FILL OUT | DISCUSSED | FEEDBACK | SUBMIT(TED) | PUSHED | |

SYSTEMS AND METHODS FOR LINKING ATTACHMENTS TO CHAT MESSAGES

BACKGROUND

Field

The present disclosure is generally directed to provision of attachments, and more specifically, to linking attachments within chat messages.

Related Art

Related art messaging applications have become a communication tool in modern enterprises. Employees are familiar with the simple text chat metaphor, and desire to have all their communications be handled inside a single space.

In observations of such use of related art applications, users may reference many external sources in their chats, such as images (screenshots), links to externally hosted documents and web pages, or upload document files and even videos. Users then discuss these attachments by texting about what they did (e.g. "I changed slide 2"), what they agree or disagree with on these attachments (e.g. "slide 2 should read testing instead of treating").

Although users may handle their commenting and document-centric discussions inside the documents themselves (e.g. using commenting, highlighters, etc.), users seem to prefer handling document discussions all in this central place represented by the chat space, thereby allowing everybody to see what happens, even if the result can be messy and difficult to understand. However, such implementations can have a big cognitive cost, as time is spent figuring out what is referred to in chat messages: which document, where is it in the chat history (was it uploaded or linked to), once located, users need to open it and navigate to slide 2 to finally see what was referred to, and so on. The problem is amplified when new, unrelated messages also appear, which renders it difficult for teams that are geographically distributed (across time zones sometimes) where users need to make sense of a long list of unread messages.

SUMMARY

Example implementations described herein are directed to linking parts of attachments inside text messages. Similar to mentioning users in a conversation by their "handle" or "screen name", (e.g. "@name did you see this?") example implementation allows users to quickly insert parts of previously shared attachments into chat messages. Document fragments become first-order parts-of-speech in the message-centric enterprise communication tool.

Example implementations address the problem of referring to previously shared content over messaging applications. For example, suppose a user types "please fix 'tuttoring' to 'tutoring' in slide 2", which may be vague and burdensome as readers are tasked with understanding what document is referenced, finding it in the chat history, opening it and finally going to "slide 2". In example implementations described herein, as the user types the message, the user is shown an autocomplete window from which to pick a likely attachment fragment. The example implementations utilize a combination time and date, content matching, metadata matching (slide→presentation, page→office document) and user actions to populate the auto suggestion window with appropriate suggestions.

In example implementations of the present disclosure, users can link previously shared documents inside their text-centric chat or email communication tool. Such documents can include a previous message, pictures/images, web pages, office documents, office files, videos, and so on, which can be directly uploaded or externally linked to (e.g. web links).

In example implementations, when a trigger is detected in the messaging application (e.g. using the special @ character for example) or where the system automatically prompts the user when they are about to "send" their message (e.g. "did you mean to link to this part of this document?) or after they've typed enough text in order for the system to suggest something (e.g. "in slide 2, I . . . "), the system finds not only the matching documents, but also the location inside these documents: a document fragment (e.g. slide 2, introduction paragraph, face of a person in an image, frame at second 5 in video lecture where a keyword appears). The documents and their fragments can be selected based on time, content, metadata and previous user's actions (e.g. the user read that attachment and selected text or mouse over passages, then texts about that).

Aspects of the present disclosure can include a method, which can involve, for input provided to a messaging application, parsing the input to determine document parameters; determining previously linked documents in messages of the messaging application corresponding to the document parameters; and embedding at least one of a selected document fragment or document link from the determined previously linked documents.

Aspects of the present disclosure can further include a non-transitory computer readable medium, storing instructions for executing a process. The instructions can include, for input provided to a messaging application, parsing the input to determine document parameters; determining previously linked documents in messages of the messaging application corresponding to the document parameters; and embedding at least one of a selected document fragment or document link from the determined previously linked documents.

Aspects of the present disclosure can further include an apparatus, which can involve a processor, configured to: for input provided to a messaging application, parse the input to determine document parameters; determine previously linked documents in messages of the messaging application corresponding to the document parameters; and embed at least one of a selected document fragment or document link from the determined previously linked documents.

DETAILED DESCRIPTION

The following detailed description provides further details of the figures and example implementations of the present application. Reference numerals and descriptions of redundant elements between figures are omitted for clarity. Terms used throughout the description are provided as examples and are not intended to be limiting. For example, the use of the term "automatic" may involve fully automatic or semi-automatic implementations involving user or administrator control over certain aspects of the implementation, depending on the desired implementation of one of ordinary skill in the art practicing implementations of the present application. Selection can be conducted by a user through a user interface or other input means, or can be implemented through a desired algorithm. Example implementations as described herein can be utilized either singularly or in combination and the functionality of the example implementations can be implemented through any means according to the desired implementations.

Example implementations of the present disclosure are directed to the recognition of user preference to handle communication inside a single space, and extends the communication space to make referencing attachments more explicit and efficient, while preserving the text-centric nature of the medium. There is a need for the extraction of fragments and insertion inline as first-class parts-of-speech within the message box.

In an example implementation, users can invoke the functionality by typing a special character, such as @ which is familiar to chat users to auto-complete user names in related art messaging applications. In addition to completing names, the @ also triggers auto-completion for document fragments. For example, if a user types "the background paragraph in @", example implementations can automatically find and clip the corresponding section of a previously shared document. In example implementations, matching can occur based on metadata (e.g., keyword "slide" maps to finding PPT files, "page" to finding DOC/PDF files), and content using keyword matching between words in the text message and document content. Time can be used in example implementations to rank the list of suggestions by decreasing order when the document was originally shared (e.g., most recent first).

Figure 1A:
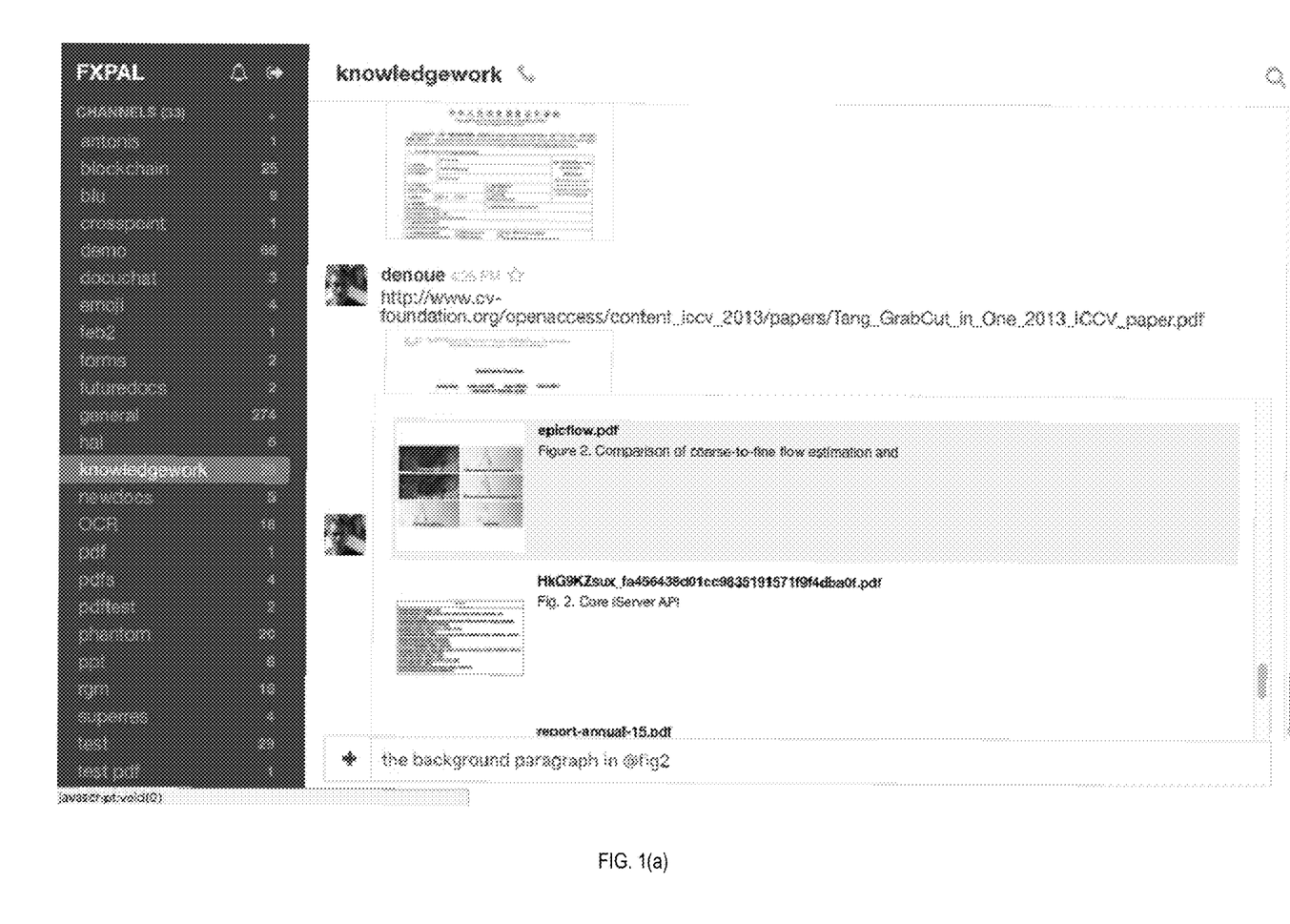
FIGS. 1(a) to 1(c) illustrate screenshots of an example messaging application, in accordance with an example implementation.
Figure 1B:
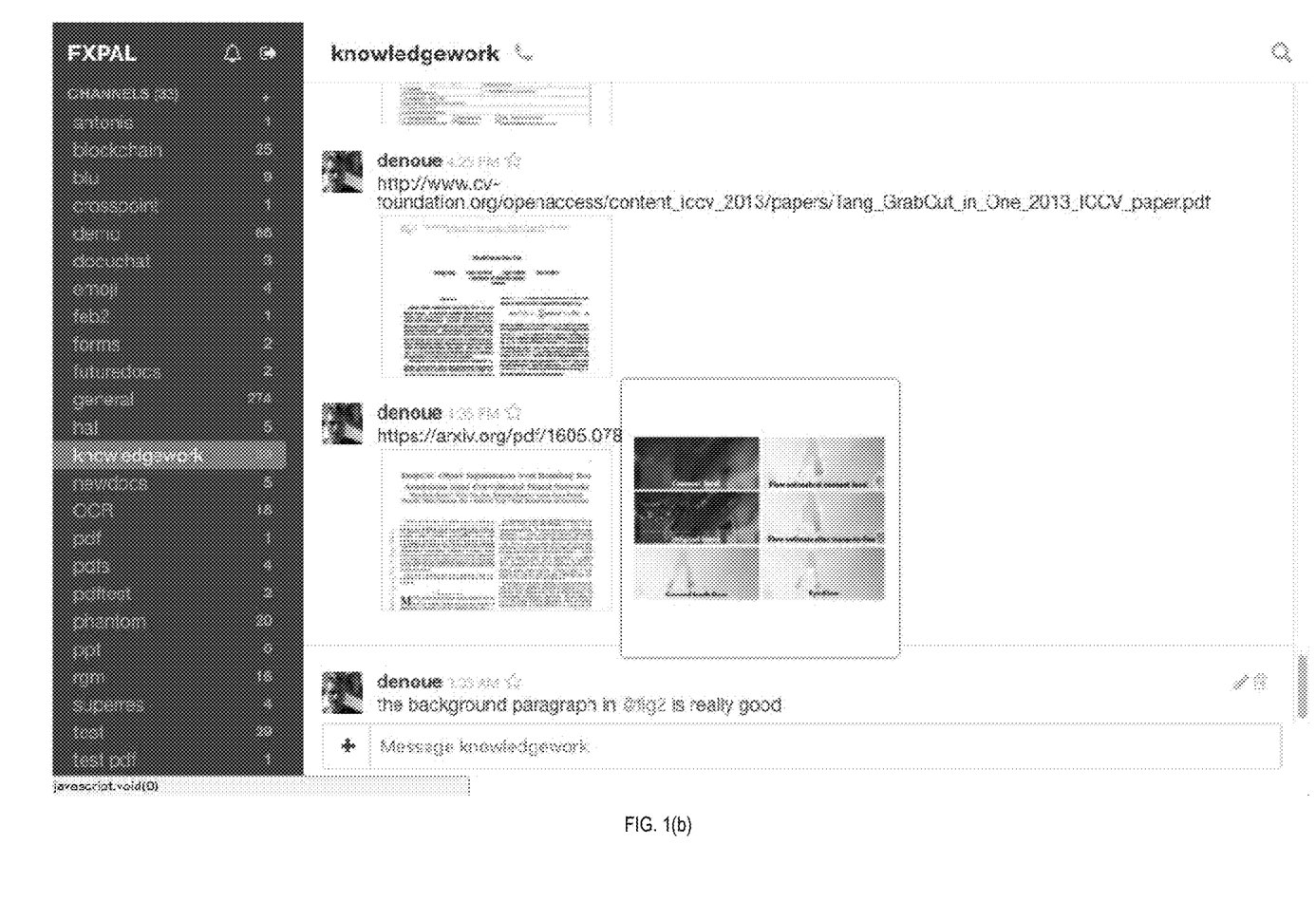
Figure 1C:
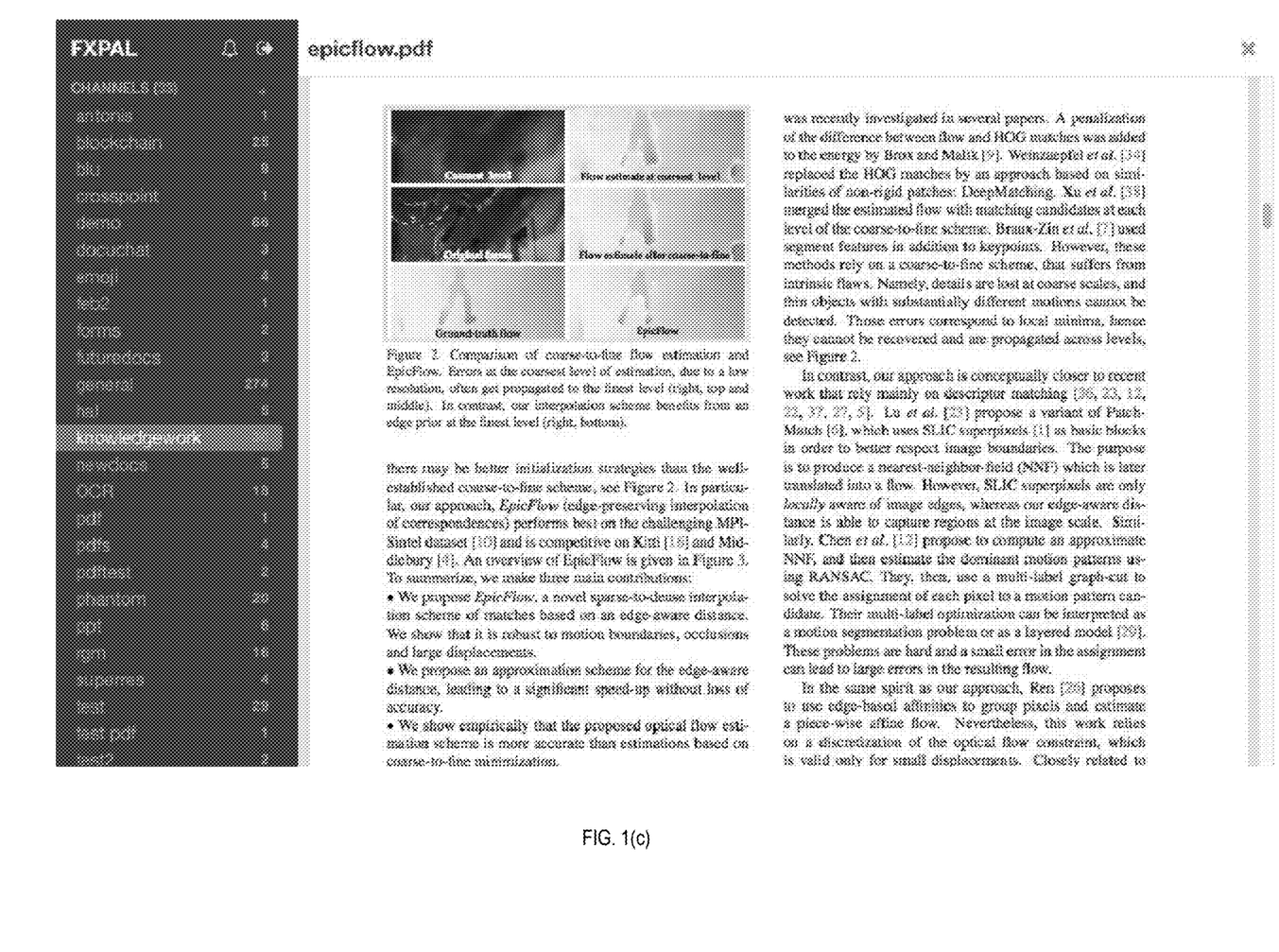

FIGS. 1(a) to 1(c) illustrate screenshots of an example messaging application, in accordance with an example implementation. In the example screenshot of FIG. 1(a), the user types an @ and the system suggests a document fragment from the previously shared document where "background" (content-based matching) was the name of the "paragraph" (metadata-based matching). After the user clicks the suggestion, the text message includes a copy of the fragment, allowing other users to directly jump into that passage in the document. In additional example implementations, a hyperlink can be inserted in the text message instead of a visual cutout of the figure, if such an implementation is desired. Either implementation is possible, and both can be utilized according to the desired implementation. For example, example implementations involving hyperlinks can flow with the text and allow the users to hover over the links to reveal the document fragment, as illustrated in the example screenshot of FIG. 1(b). Once the user clicks on the link, the user is provided with the document and the document is scrolled to that location and highlights the fragment in the document page as illustrated in the example screenshot of FIG. 1(c).

In example implementations, users can also enter or provide text, such as "slide 2 should read tutoring" in the chat application. The system will also suggest to link that text message to the second slide of the previously shared slide presentation.

As described in the present disclosure, example implementations use a combination of time, metadata, content, and actions to populate the suggestion window, allowing users to quickly pick the relevant portions that they intended to communicate in the message.

In example implementations, when the user triggers the suggestion using @, the system is configured to examine previous words on the left in the text. Tests of example implementations have demonstrated that users employ the keywords "slide" or "page" followed by numbers when they need to cite previously shared content. Sometimes, users only use keywords that appear in the previously shared documents, e.g. "tutoring".

Tests of the example implementations have demonstrated that users refer to documents in their text messages using words that pertain to the content and structure of the document, or what they did on the documents (e.g., uploaded, commented, edited). Example implementations thereby utilize such lists of keywords to find relevant documents and their fragments. For example, "slide" is used to select slide presentations or document containing slides, "page" is used to select office documents, and "table" can trigger a search for tables in previously shared documents.

Figure 2:
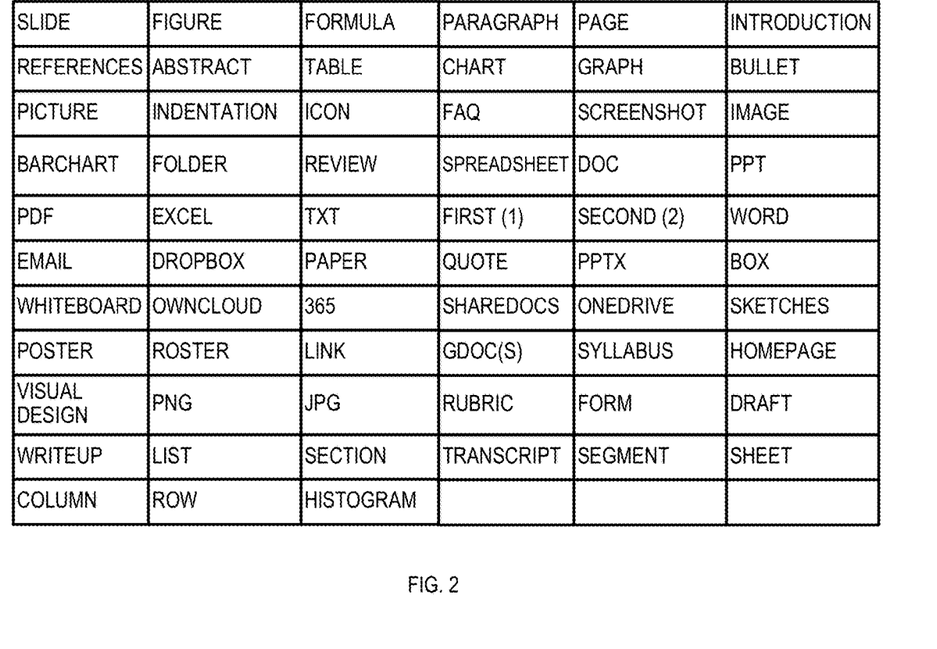
FIG. 2 illustrates example management information for vocabulary that indicates the user is likely referring to document(s) and their fragments, in accordance with an example implementation.

FIG. 2 illustrates example management information for vocabulary that indicates the user is likely referring to document(s) and their fragments, in accordance with an example implementation. Specifically, FIG. 2 illustrates words that were used to refer to parts of documents. Such words do not necessarily appear in the document itself (e.g. formula, paragraph) because they refer to the structure of the document. Example implementations can utilize layout analysis to map keywords from FIG. 2 to specific places in the document (e.g. "formula" to every place in the document where a formula is shown). In example implementations, the language utilized in the message applications are linked to the layouts of documents. For example, when the word "slide" or "figure" or "chart" or "page" is input into the messaging application, the messaging application analyzes the documents for the layout information that match the key words utilized.

Figure 3:
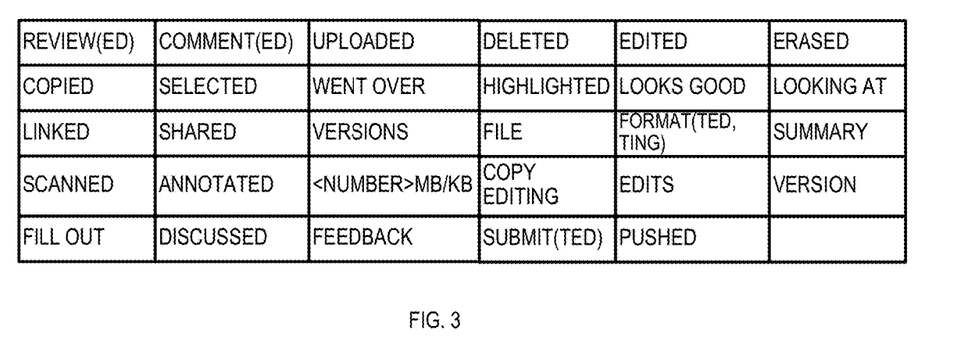
FIG. 3 illustrates management information in accordance with an example implementation.

FIG. 3 illustrates management information in accordance with an example implementation. Specifically, FIG. 3 illustrates examples of vocabulary indicating user actions on documents, usually prefixed by "I . . . " but not always. In addition to specifying document structure, users also write words pertaining to actions they have done on documents, such as uploading them, editing them, and so on.

Further observations have shown that users upload several times edited versions of the "same" document they are working on. Users sometimes refer to documents using parts of the filenames, e.g. "with respect to the spec" and the filename is "motivator_2.0_spec_plans_store_v5". Example implementations thereby also utilize filenames during the retrieval of document candidates. To avoid clutter in the suggestion window, the other detected versions are shown with links next to the most recent fragment, allowing users to continue to link to an earlier one.

Further, if one or several users have opened a document, the example implementations can also track the user actions (e.g., mouse motion, text selections, scrolling information). The example implementations can take such signals into account for returning relevant fragments when no other signal (e.g. a keyword) is available, or combine them. For example, a keyword is given in the chat message, but the keyword appears many times in the document; the example implementations extract the fragment that contains the keyword and was read by the user first, as indicated by scroll position, text and mouse selections.

Content based selection can also be utilized in example implementations. Keywords appearing in the user message can be used to match potential documents. Frequently, users will retype verbatim rather long passages of a document to make their "link" very specific, e.g. "you need x points to advance to" or they cite keywords e.g. "when both 'daily' and 'during homestretch'".

These types of messages are easy to use to precisely match the corresponding documents. At other times, the words used in the text message appear several times in several documents: in that case example implementations can filter based on metadata as well (e.g. from user actions). If such metadata is not available, example implementations can also list the matching document parts by most recent first.

Typically, a set of messages are exchanged by users about the same document. In example implementations, the system also uses previously sent message content to retrieve the documents. In particular, if the previous message already had a link to a fragment, the system can show the same fragment by default if no other signal is found in the content of the current message, or the metadata.

Finally, when the linked document is a video, example implementations can match the text of the message with the video transcript to recommend specific times in the video most relevant to the message content.

Further, as users tend to discuss recent documents, example implementations can also utilize time-based selection, wherein the suggestions are shown in the most recent first order.

Figure 4:
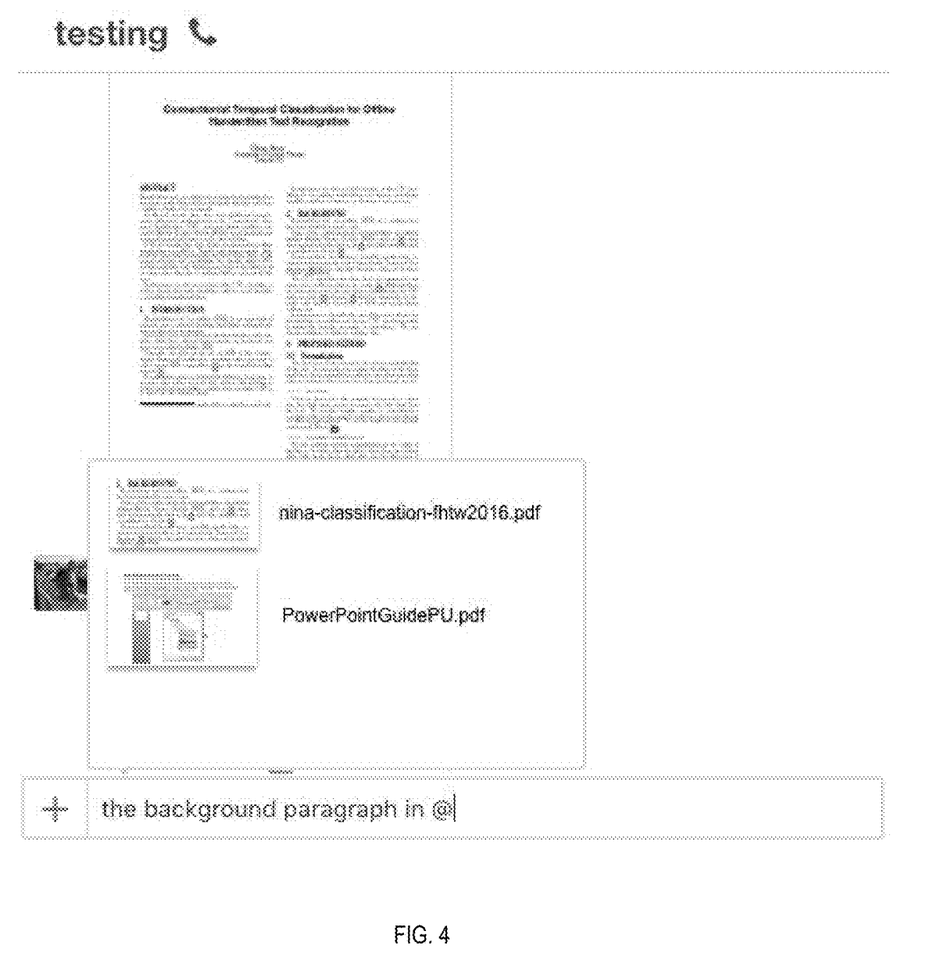
FIG. 4 illustrates an example screenshot wherein the suggestion window provides relevant document fragments based on the currently typed text in the chat box, in accordance with an example implementation.
Figure 5:
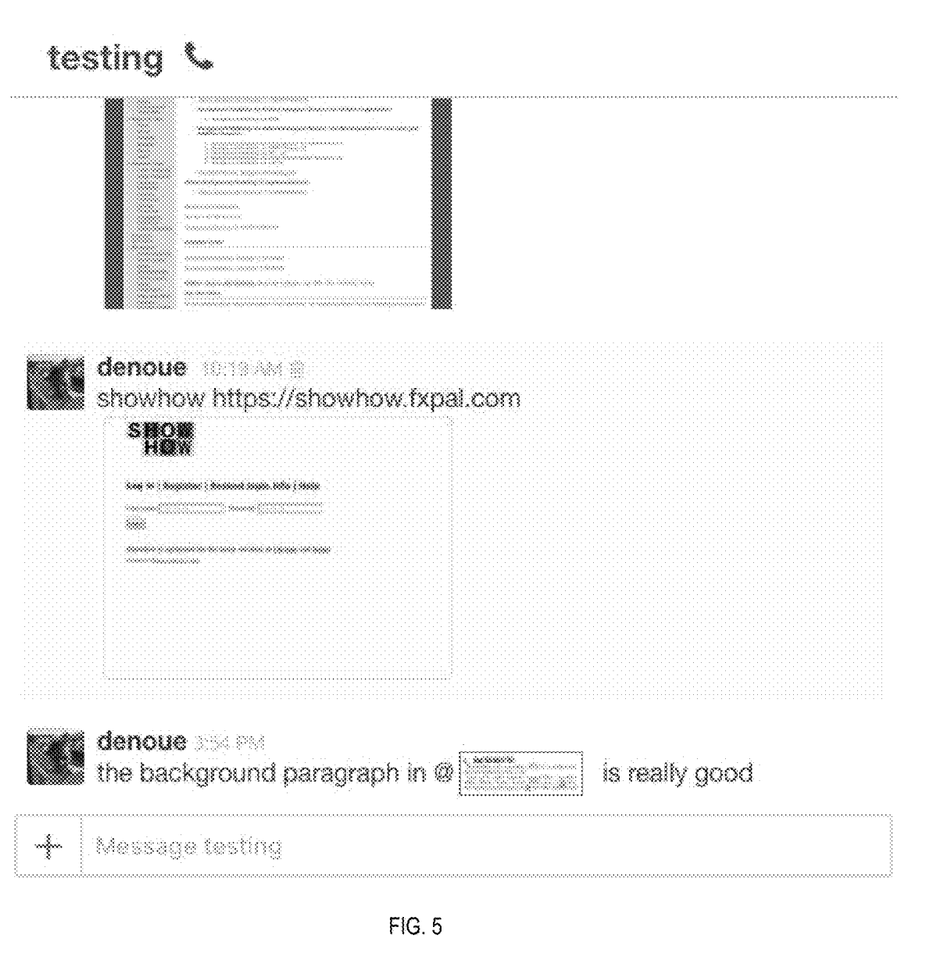
FIG. 5 illustrates an example screenshot wherein the user clicked on the first suggestion from FIG. 4, and creates an explicit link to the document fragment, making it a first-class part-of-speech in the chat message, in accordance with an example implementation.

Example implementations can also conduct selections of document fragments. FIG. 4 illustrates an example screenshot wherein the suggestion window provides relevant document fragments based on the currently typed text in the chat box, in accordance with an example implementation. When the retrieval engine found a document page or slide, it simply extracts this page/slide from the document and shows it in the suggestion window, optionally along with the filename of the attachment. As shown in FIG. 4, more than one document fragment can be recommended. FIG. 5 illustrates an example screenshot wherein the user clicked on the first suggestion from FIG. 4, and creates an explicit link to the document fragment, making it a first-class part-of-speech in the chat message.

When a specific keyword is found, example implementations can further crop the document around this location, while respecting the document layout. Depending on the desired implementation, document snippets can be extracted based on layout and user's actions, when available. If the Document Object Model (DOM) of the documents are available (e.g., non-scanned documents, rich text format files), the system leverages the DOM to directly extract bulleted lists, titles, figures, charts, tables, and so on.

Figure 6:
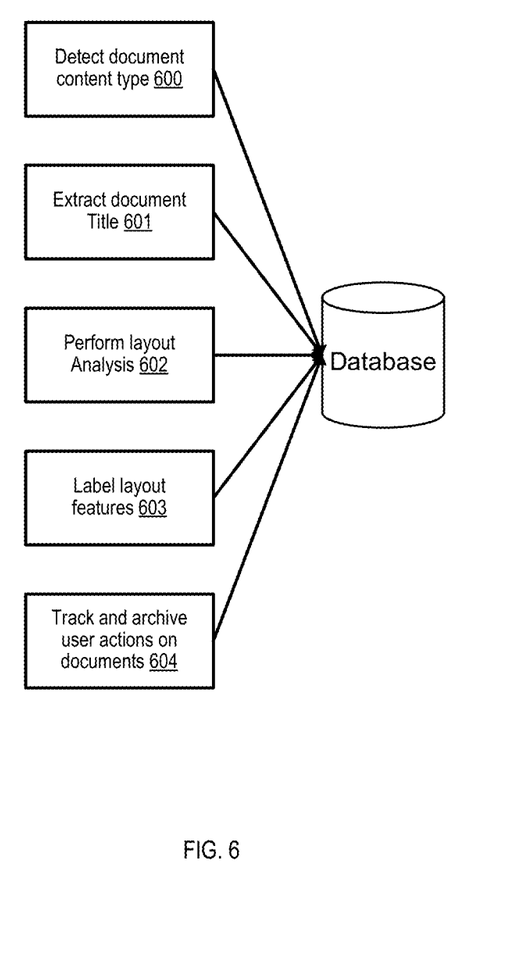
FIGS. 6 and 7 illustrate example flow diagrams in accordance with an example implementation.

FIG. 6 illustrates an example flow diagram in accordance with an example implementation. Specifically, FIG. 6 illustrates the flow for document intake. Documents are initially ingested and indexed using their content-type, title, as well as features detected from layout analysis. Furthermore, user actions on documents are archived continuously. In example implementations, layout analysis is executed on each of the documents in the database, so as to provide metadata search and indexing such that the documents can be searched in real time without having to traverse through the entire document.

At 600, the system detects the document content type (e.g., slide, text, code, etc.) for ingested documents. At 601, the document titles are extracted from the ingested documents. At 602, layout analysis is performed on the documents. Layout analysis can be conducted on the documents according to any desired implementation to extract the layout features (figures, pages, tables, etc.) from the documents and generate metadata information to describe the document layout.

At 603, based on the layout analysis, layout features (e.g., figures, tables, etc.) are labeled and the features are associated with the document as metadata. At 604, the system tracks and archives user actions on documents, and associates user actions in the form of metadata with each of the corresponding documents. From the flow of FIG. 6, example implementations can thereby manage a database of documents and each of those documents is associated with layout information. Thus, when key words are provided within the chat application, the layouts can be parsed for those key words instead of having to traverse through the entire document.

Figure 7:
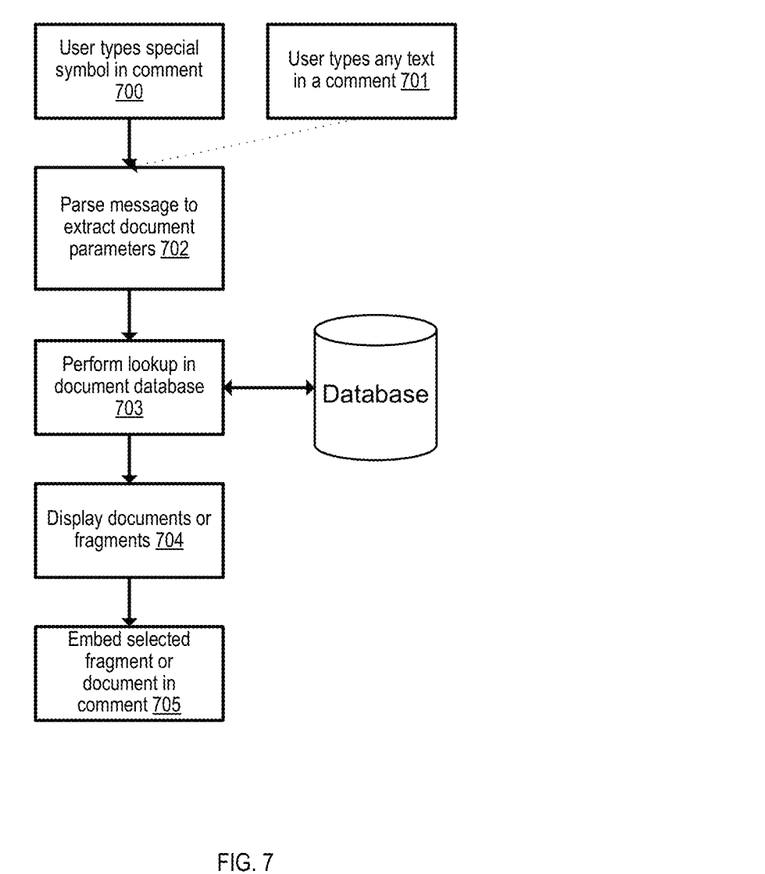

FIG. 7 illustrates an example flow diagram in accordance with an example implementation. When a user types a special symbol such as "@" or any other designated special symbol according to the desired implementation, the system parses the comment and suggests relevant documents and fragments.

At 700, the user can type a special symbol in the comment. Alternatively, depending on the desired implementation, the user can type in any text in the comment and the system can determine whether such text is directed to a document or not at 701. Such a feature may be enabled or disabled depending on the desired implementation.

At 702, the system parses the input message to the chat application to extract document parameters. Such parameters can include names, type, layout components, and user actions, depending on the desired implementation. Such parameters can be extracted from the layout information provided from the execution of layout analysis on each of the documents as described in FIG. 6. At 703, based on the extracted document parameters, the system performs a lookup in the document database. At 704, the system displays documents and/or fragments. In example implementations, time-ordered documents can be displayed, or fragments of documents can be provided for the user to select or link. At 705, the selected fragment or document can then be embedded in the comment.

Figure 8:
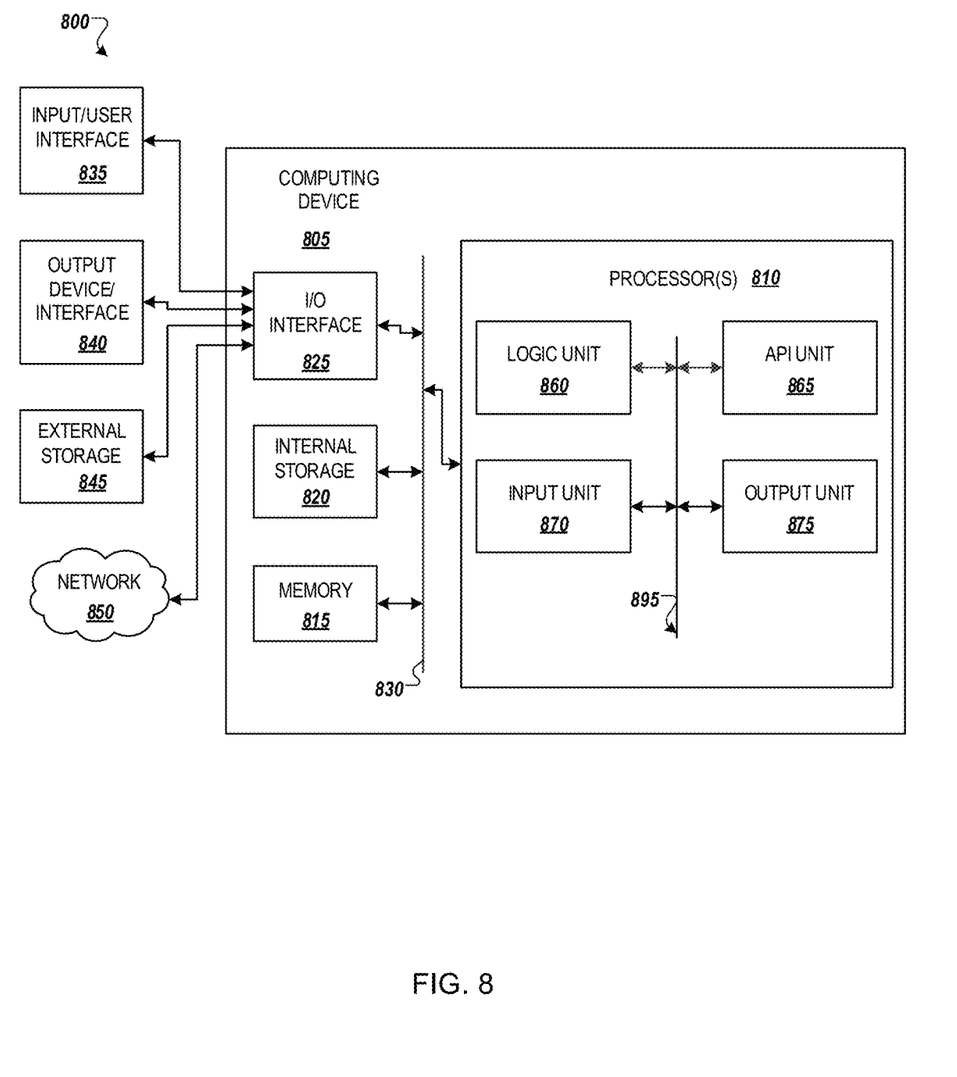
FIG. 8 illustrates an example computing environment with an example computer device suitable for use in some example implementations.

FIG. 8 illustrates an example computing environment with an example computer device suitable for use in some example implementations, such as an apparatus to facilitate the management of a messaging application along with a database of documents. In example implementations, work surfaces can include any surface that an RF sensor can be affixed to and that is utilized for interactions from users, such as a work desk, a cashier counter, a table, a shelf with dishes or plates, and so on according to the desired implementation.

Computer device 805 in computing environment 800 can include one or more processing units, cores, or processors 810, memory 815 (e.g., RAM, ROM, and/or the like), internal storage 820 (e.g., magnetic, optical, solid state storage, and/or organic), and/or I/O interface 825, any of which can be coupled on a communication mechanism or bus 830 for communicating information or embedded in the computer device 805.

Computer device 805 can be communicatively coupled to input/user interface 835 and output device/interface 840. Either one or both of input/user interface 835 and output device/interface 840 can be a wired or wireless interface and can be detachable. Input/user interface 835 may include any device, component, sensor, or interface, physical or virtual, that can be used to provide input (e.g., buttons, touch-screen interface, keyboard, a pointing/cursor control, microphone, camera, braille, motion sensor, optical reader, and/or the like). Output device/interface 840 may include a display, television, monitor, printer, speaker, braille, or the like. In some example implementations, input/user interface 835 and output device/interface 840 can be embedded with or physically coupled to the computer device 805. In other example implementations, other computer devices may function as or provide the functions of input/user interface 835 and output device/interface 840 for a computer device 805.

Examples of computer device 805 may include, but are not limited to, highly mobile devices (e.g., smartphones, devices in vehicles and other machines, devices carried by humans and animals, and the like), mobile devices (e.g., tablets, notebooks, laptops, personal computers, portable televisions, radios, and the like), and devices not designed for mobility (e.g., desktop computers, other computers, information kiosks, televisions with one or more processors embedded therein and/or coupled thereto, radios, and the like).

Computer device 805 can be communicatively coupled (e.g., via I/O interface 825) to external storage 845 and network 850 for communicating with any number of networked components, devices, and systems, including one or more computer devices of the same or different configuration. Computer device 805 or any connected computer device can be functioning as, providing services of, or referred to as a server, client, thin server, general machine, special-purpose machine, or another label.

I/O interface 825 can include, but is not limited to, wired and/or wireless interfaces using any communication or I/O protocols or standards (e.g., Ethernet, 802.11x, Universal System Bus, WiMax, modem, a cellular network protocol, and the like) for communicating information to and/or from at least all the connected components, devices, and network in computing environment 800. Network 850 can be any network or combination of networks (e.g., the Internet, local area network, wide area network, a telephonic network, a cellular network, satellite network, and the like).

Computer device 805 can use and/or communicate using computer-usable or computer-readable media, including transitory media and non-transitory media. Transitory media include transmission media (e.g., metal cables, fiber optics), signals, carrier waves, and the like. Non-transitory media include magnetic media (e.g., disks and tapes), optical media (e.g., CD ROM, digital video disks, Blu-ray disks), solid state media (e.g., RAM, ROM, flash memory, solid-state storage), and other non-volatile storage or memory.

Computer device 805 can be used to implement techniques, methods, applications, processes, or computer-executable instructions in some example computing environments. Computer-executable instructions can be retrieved from transitory media, and stored on and retrieved from non-transitory media. The executable instructions can originate from one or more of any programming, scripting, and machine languages (e.g., C, C++, C#, Java, Visual Basic, Python, Perl, JavaScript, and others).

Processor(s) 810 can execute under any operating system (OS) (not shown), in a native or virtual environment. One or more applications can be deployed that include logic unit 860, application programming interface (API) unit 865, input unit 870, output unit 875, and inter-unit communication mechanism 895 for the different units to communicate with each other, with the OS, and with other applications (not shown). The described units and elements can be varied in design, function, configuration, or implementation and are not limited to the descriptions provided.

In some example implementations, when information or an execution instruction is received by API unit 865, it may be communicated to one or more other units (e.g., logic unit 860, input unit 870, output unit 875). In some instances, logic unit 860 may be configured to control the information flow among the units and direct the services provided by API unit 865, input unit 870, output unit 875, in some example implementations described above. For example, the flow of one or more processes or implementations may be controlled by logic unit 860 alone or in conjunction with API unit 865. The input unit 870 may be configured to obtain input for the calculations described in the example implementations, and the output unit 875 may be configured to provide output based on the calculations described in example implementations.

Memory 815 can be configured to manage keyword information as illustrated in FIG. 2 and FIG. 3 to determine when a document is being mentioned in the messaging application. Memory 815 can also be configured to manage a database of documents, each document having associated layout information providing information regarding the layout of the document, and user action information pertaining to what user actions have been conducted with the document within the context of the messaging application.

Processor(s) 810 can be configured to, for input provided to a messaging application, parse the input to determine document parameters as shown, for example through the comparison of the key words with the keyword information in memory 815, and determine previously linked documents in messages of the messaging application corresponding to the document parameters. Processor(s) 810 can be further configured to embed at least one of a selected document fragment or document link from the determined previously linked documents as illustrated in FIGS. 4 and 5, through execution of the flow as illustrated in FIG. 7.

Processor(s) 810 can also be configured to parse the input to determine the document parameters through a detection of a trigger in the input (e.g. such as through the input of a special character such as '@' or others depending on the desired implementation), wherein the processor is configured to determine the document parameters from the input subsequent to the trigger through parsing the keywords following the special trigger (e.g. '@slide 2' triggers the processing of document search based on the keywords 'slide 2').

Processor(s) 810 can also be configured to determine previously linked documents in the messages of the messaging application corresponding to the document parameters through a determination, from the document parameters, locations within the previously linked documents corresponding to the document parameters based on layout information associated with the document parameters; and wherein the processor is configured to display document fragments associated with the locations, through comparisons of the layout of the documents as provided from FIG. 6. For example, in the previous example input of '@slide 2', the fragment retrieved would be the second slide of the relevant document.

Processor(s) 810 can also be configured to rank the previously linked documents based on recency of the previously linked documents being referenced in the messages. In an example implementation, the previous messages in the message chain between users may have mentioned documents. Such documents would tend to be more relevant as they were more recently discussed in the message chain, and can therefore be ranked higher than other documents in the database.

Processor(s) 810 can also be configured to determine the previously linked documents in the messages of the messaging application corresponding to the document parameters through selecting the previously linked documents associated with previous user actions in the messaging application, as described, for example, with respect to FIG. 3.

Some portions of the detailed description are presented in terms of algorithms and symbolic representations of operations within a computer. These algorithmic descriptions and symbolic representations are the means used by those skilled in the data processing arts to convey the essence of their innovations to others skilled in the art. An algorithm is a series of defined steps leading to a desired end state or result. In example implementations, the steps carried out require physical manipulations of tangible quantities for achieving a tangible result.

Unless specifically stated otherwise, as apparent from the discussion, it is appreciated that throughout the description, discussions utilizing terms such as "processing," "computing," "calculating," "determining," "displaying," or the like, can include the actions and processes of a computer system or other information processing device that manipulates and transforms data represented as physical (electronic) quantities within the computer system's registers and memories into other data similarly represented as physical quantities within the computer system's memories or registers or other information storage, transmission or display devices.

Example implementations may also relate to an apparatus for performing the operations herein. This apparatus may be specially constructed for the required purposes, or it may include one or more general-purpose computers selectively activated or reconfigured by one or more computer programs. Such computer programs may be stored in a computer readable medium, such as a computer-readable storage medium or a computer-readable signal medium. A computer-readable storage medium may involve tangible mediums such as, but not limited to optical disks, magnetic disks, read-only memories, random access memories, solid state devices and drives, or any other types of tangible or non-transitory media suitable for storing electronic information. A computer readable signal medium may include mediums such as carrier waves. The algorithms and displays presented herein are not inherently related to any particular computer or other apparatus. Computer programs can involve pure software implementations that involve instructions that perform the operations of the desired implementation.

Various general-purpose systems may be used with programs and modules in accordance with the examples herein, or it may prove convenient to construct a more specialized apparatus to perform desired method steps. In addition, the example implementations are not described with reference to any particular programming language. It will be appreciated that a variety of programming languages may be used to implement the teachings of the example implementations as described herein. The instructions of the programming language(s) may be executed by one or more processing devices, e.g., central processing units (CPUs), processors, or controllers.

As is known in the art, the operations described above can be performed by hardware, software, or some combination of software and hardware. Various aspects of the example implementations may be implemented using circuits and logic devices (hardware), while other aspects may be implemented using instructions stored on a machine-readable medium (software), which if executed by a processor, would cause the processor to perform a method to carry out implementations of the present application. Further, some example implementations of the present application may be performed solely in hardware, whereas other example implementations may be performed solely in software. Moreover, the various functions described can be performed in a single unit, or can be spread across a number of components in any number of ways. When performed by software, the methods may be executed by a processor, such as a general purpose computer, based on instructions stored on a computer-readable medium. If desired, the instructions can be stored on the medium in a compressed and/or encrypted format.

Moreover, other implementations of the present application will be apparent to those skilled in the art from consideration of the specification and practice of the teachings of the present application. Various aspects and/or components of the described example implementations may be used singly or in any combination. It is intended that the specification and example implementations be considered as examples only, with the true scope and spirit of the present application being indicated by the following claims.

What is claimed is:

1. A method, comprising:
    for input provided to a messaging application, parsing the input to determine document parameters;
    determining previously linked documents in messages of the messaging application corresponding to the document parameters; and
    embedding at least one of a selected document fragment or document link from the determined previously linked documents.

2. The method of claim 1, wherein the parsing the input to determine the document parameters comprises:
    detecting a trigger in the input; and
    determining the document parameters from the input subsequent to the trigger.

3. The method of claim 1, wherein the determining previously linked documents in the messages of the messaging application corresponding to the document parameters comprises:
    determining, from the document parameters, locations within the previously linked documents corresponding to the document parameters based on layout information associated with the document parameters; and
    displaying document fragments associated with the locations.

4. The method of claim 1, wherein the previously linked documents are ranked based on recency of the previously linked documents being referenced in the messages.

5. The method of claim 1, wherein the determining previously linked documents in the messages of the messaging application corresponding to the document parameters comprises selecting the previously linked documents associated with previous user actions in the messaging application.

6. The method of claim 1, wherein the previously linked documents are selected from a database of documents wherein each of the documents in the database is associated with layout information generated from layout analysis executed on the documents.

7. A non-transitory computer readable medium, storing instructions for executing a process comprising:
for input provided to a messaging application, parsing the input to determine document parameters;
determining previously linked documents in messages of the messaging application corresponding to the document parameters; and
embedding at least one of a selected document fragment or document link from the determined previously linked documents.

8. The non-transitory computer readable medium of claim 7, wherein the parsing the input to determine the document parameters comprises:
detecting a trigger in the input; and
determining the document parameters from the input subsequent to the trigger.

9. The non-transitory computer readable medium of claim 7, wherein the determining previously linked documents in the messages of the messaging application corresponding to the document parameters comprises:
determining, from the document parameters, locations within the previously linked documents corresponding to the document parameters based on layout information associated with the document parameters; and
displaying document fragments associated with the locations.

10. The non-transitory computer readable medium of claim 7, wherein the previously linked documents are ranked based on recency of the previously linked documents being referenced in the messages.

11. The non-transitory computer readable medium of claim 7, wherein the determining previously linked documents in the messages of the messaging application corresponding to the document parameters comprises selecting the previously linked documents associated with previous user actions in the messaging application.

12. The non-transitory computer readable medium of claim 7, wherein the previously linked documents are selected from a database of documents wherein each of the documents in the database is associated with layout information generated from layout analysis executed on the documents.

13. An apparatus, comprising:
a processor, configured to:
for input provided to a messaging application, parse the input to determine document parameters;
determine previously linked documents in messages of the messaging application corresponding to the document parameters; and
embed at least one of a selected document fragment or document link from the determined previously linked documents.

14. The apparatus of claim 13, wherein the processor is configured to parse the input to determine the document parameters through a detection of a trigger in the input, wherein the processor is configured to determine the document parameters from the input subsequent to the trigger.

15. The apparatus of claim 13, wherein the processor is configured to determine previously linked documents in the messages of the messaging application corresponding to the document parameters through a determination, from the document parameters, locations within the previously linked documents corresponding to the document parameters based on layout information associated with the document parameters; and wherein the processor is configured to display document fragments associated with the locations.

16. The apparatus of claim 13, wherein the processor is configured to rank the previously linked documents based on recency of the previously linked documents being referenced in the messages.

17. The apparatus of claim 13, wherein processor is configured to determine the previously linked documents in the messages of the messaging application corresponding to the document parameters through selecting the previously linked documents associated with previous user actions in the messaging application.

18. The apparatus of claim 13, further comprising a memory configured to manage a database of documents wherein each of the documents in the database is associated with layout information generated from layout analysis executed on the documents, wherein the previously linked documents are selected from the database of documents.

* * * * *